United States Patent [19]

Vassiliades

[11] Patent Number: 5,053,277

[45] Date of Patent: Oct. 1, 1991

[54] MICROCAPSULES AND THEIR PRODUCTION

[76] Inventor: Anthony E. Vassiliades, 8738 Tanager Woods Dr., Cincinnati, Ohio 45249

[21] Appl. No.: 15,904

[22] Filed: Feb. 18, 1987

[51] Int. Cl.[5] .......................... B01J 13/10; B01J 13/20

[52] U.S. Cl. ...................................... 428/402.2; 8/526; 264/4.1; 264/4.3; 264/4.7; 428/402.21; 503/213

[58] Field of Search ................................ 264/4.1, 4.3; 428/402.2, 402.21; 8/526

[56] References Cited

U.S. PATENT DOCUMENTS

| | | | |
|---|---|---|---|
| 3,287,154 | 11/1966 | Haas | 503/219 X |
| 3,535,139 | 10/1970 | Watanabe et al. | 428/402.2 X |
| 3,906,123 | 9/1975 | Vincent et al. | 503/214 |
| 4,197,346 | 4/1980 | Stevens | 428/402.21 X |
| 4,303,719 | 12/1981 | Vassiliades | 428/914 X |
| 4,347,283 | 8/1982 | Hiraishi et al. | 428/914 X |
| 4,480,002 | 10/1984 | Asano et al. | 8/526 X |
| 4,578,339 | 3/1986 | Adkins | 428/402.2 X |
| 4,686,548 | 8/1987 | Takahashi et al. | 503/213 |

FOREIGN PATENT DOCUMENTS 2160992 1/1986 United Kingdom .

*Primary Examiner*—Richard D. Lovering

[57] ABSTRACT

The present invention comprises a pressure-sensitive chromogenic copy system comprising a transfer sheet having on at least a portion of at least one surface thereof a coating of microcapsules having encapsulated therein a solution in an oleophilic solvent of the reaction product of at least one leuco chromogenic compound and at least one electron-accepting color developer capable of reacting with said leuco chromogenic compound in an oleophilic solvent; the oleophilic solvent being a solvent for said leuco chromogenic compound, said color developer and said reaction product. The invention also comprises the transfer sheets, microcapsules, and method of making such microcapsules.

6 Claims, No Drawings

MICROCAPSULES AND THEIR PRODUCTION

BACKGROUND OF THE INVENTION

The present invention relates to methods of producing novel transfer sheets used in pressure-sensitive carbonless copy systems, the resultant copy systems, and methods of producing self-contained transfer sheets for carbonless copy systems. Additionally, this invention relates to methods of improving the stability and performance of the leuco chromogenic compounds used in the preparation of carbonless copy systems.

Carbonless copying systems employing chromogenic materials have been used commercially in various applications for several years. One of the most common uses of such carbonless systems has been in pressure sensitive copy systems wherein a colorless chromogenic material dissolved in an oily solvent is encapsulated and coated onto the back of a transfer substrate, usually referred to as the transfer sheet or CB part of a carbonless system. With the application of localized pressure such as from a stylus or a typewriter, pen, or other implement, the microcapsules rupture and the chromogen solution is transferred to the front of an underlying sheet having an absorbent coating of a Lewis acid, or other color-developing material which reacts with the chromogen released from the ruptured microcapsules to produce visible colored images; the underlying or receiving sheet is usually referred to as the receptor sheet or CF part of a carbonless system. Multiple-ply business forms can be produced by properly assembling a CB part and a CF part with a number of CFB (coated front and back) parts interposed between the CB and the CF parts.

In addition to the conventional carbonless copy systems described above, there are also commercially available self-contained carbonless copying systems in which the encapsulated chromogen and the Lewis acid materials are incorporated on the same substrate surface, usually the front, and upon application of pressure to the surface, the capsules are ruptured releasing the chromogen solution which is immediately absorbed by the surrounding environment of the Lewis acid material, and produces the visible colored image.

Heretofore, self-contained carbonless systems have been produced by a variety of methods. In the "multiple-coating" method, the chromogen containing microcapsules are first coated unto the substrate, followed by the coating of a film-forming substance such as polyvinyl alcohol, gelatin and the like, on top of the microcapsule coating, and followed by the coating of the Lewis acid material on top of the film-forming substance. The "multiple-coating" method is tedious, time consuming, and rather costly. Additionally, the final product, usually a paper substrate containing all three coatings on the same surface, is not not very aesthetically attractive. The repeated wetting and drying of the paper during the three coating applications without the ability to calendar the paper between coatings because of the presence of the rupturable microcapsules, results in an uneven, or "rough" final surface which besides being aesthetically unattractive also produces discontinuous and unclear images when such a system is used to make multiple copies.

Another method of manufacturing self-contained carbonless copy systems involves the individual encapsulation of the chromogen solution and the Lewis acid material, the subsequent admixing of the two microcapsular dispersions, and application of the mixture as a coating on the same paper surface. In such methods, extreme care must be exercised in producing microcapsules of high structural integrity and in handling the final admixed dispersions to avoid premature interaction of the two main components (chromogen and Lewis acid) which will result in the generation of colored images in unwanted sites.

An improved method of producing self-contained carbonless copy systems is described in U.S. Pat. No. 4,586,060 in which only the oily solution of the chromogen is encapsulated using microcapsules with higher wall thickness and substantially lower permeability, and which capsules are dispersed in an unencapsulated solution of the Lewis acid and coated onto the same surface of the substrate.

SUMMARY OF THE INVENTION

It has now been discovered that novel pressure-sensitive carbonless copying transfer sheets and systems can be produced and in a simpler and less costly way. It has also been found that with the instant invention, carbonless images can be produced which images possess higher color intensity and greater stability during prolonged exposures to severe atmospheric conditions especially during prolonged exposures to light.

Briefly, the present invention comprises a pressure-sensitive chromogenic copy system comprising a transfer sheet having on at least a portion of at least one surface thereof a coating of microcapsules having encapsulated therein a solution in an oleophilic solvent of the reaction product of at least one leuco chromogenic compound and at least one electron-accepting color developer capable of reacting with said leuco chromogenic compound in an oleophilic solvent; said oleophilic solvent being a solvent for said leuco chromogenic compound, said color developer and said reaction product.

The invention also comprises the novel transfer sheets, microcapsules and methods as hereinafter described.

DETAILED DESCRIPTION

The essential components of the instant microcapsular compositions are the chromogenic compounds, the electron-accepting compounds and the liquid solvents.

In accordance with this invention, images of almost any color can be produced; the preferred color, however, is black.

The leuco chromogenic compounds are dye intermediates which possess the unique property of being colorless in neutral or alkaline media, but become colored when they react with an acidic or electron-accepting substance. These dyes are, per se, well known and examples thereof that can be used in this invention are crystal violet lactone (CVL), dilactones, benzoyl leuco methylene blue (BLMB), auramines, derivatives of bis-(p-dialkylaminoaryl) methane, xanthenes, indolyls, fluorans and bisfluorans such as those described in U.S. Pat. Nos. 2,981,733, 2,981,738, 3,669,711, 3,681,390, 3,819,396, 3,821,010, and 4,302,393. The proper selection of the types and amounts of the leuco dyes to be used is extremely critical and highly dependent on the nature of the color-developing material especially if a black image of high intensity and stability is to be produced. Even though single component leuco dyes which give a true black image are unknown to date, nearly black images can be produced with fluoran type of leuco dyes such as described in U.S. Pat. No. 3,681,390. These nearly black images obtained from the fluoran leuco dyes are of relatively low intensity, and their hue and stability varies greatly depending upon the co-reactant or the color developer chosen. Oftentimes, other leuco dyes have to be combined with the nearly black fluorans to produce truer black images. The combination of various classes of leuco dyes, however, often results in undesirable fade characteristics of the images with aging, especially upon prolonged exposures to light. By the proper and careful selection and chemical treatment of the leuco dyes in this invention, it is possible to produce intense and stable images, including single or multiple dye components for the generation of black images, using a variety of color developers and/or polyvalent ions.

There are a multitude of known electron-accepting color-developing substances capable of reacting with the leuco chromogenic compounds which can be used in the present invention, and which have been described in the prior art. Among such electron-accepting substances are low molecular weight phenol-aldehyde resins (novolaks), and/or their metal salts as disclosed in U.S. Pat. Nos. 3,427,180, 3,672,935, and 3,723,156, and derivatives of aromatic carboxylic acids and/or their metal salts as disclosed in U.S. Pat. Nos. 3,488,207, 3,871,900, 3,934,070, 3,983,292, 4,303,719, and 4,372,583. Specific examples of such color-developing materials are: 3-phenyl salicylic acid, 3,5-di-tertiary butyl salicylic acid, octyl salicylic acid, 2-hydroxy-1-benzyl-3-naphthoic acid, 2-hydroxy4-methyl-5-isobutyl thiobenzoic acid, 3,3'-thiobis (2-hydroxy-5-methyl) benzoic acid, 2-hydroxy-5-butyl sulfonyl benzoic acid, condensation products of salicylic acid and salicylic acid derivatives (with, e.g., aldehydes), low molecular weight condensation products of p-phenyl phenol with formaldehyde, p-cyclohexyl phenol-formaldehyde condensation product, and p-tertiary-amyl phenol-formaldehyde condensation product.

The oleophilic solvents used in the present invention must possess good solvating characteristics for the leuco dyes and the color-developing substances to enable and enhance the reaction between the two, good flow properties for rapid and complete transfer of the microcapsular contents to the underlying sheet upon rupture of the capsules, be clear in color to avoid interference with the final hue of the image, and exhibit no adverse toxicological effects. Exemplary of the solvents in this invention are alkylated phenols such as monoisobutyl phenol and monoisopropyl phenol, chlorinated paraffins, alkylated naphthalenes, partially hydrogenated terphenyls such as Monsanto's HB-40, soya-bean oil, ester alcohols such as Eastman Kodak's Ektasolve series, and combinations thereof.

Critical to the instant invention are careful selection of the type and amount of the chromogenic compounds to give the color desired as noted previously, their controlled coupling with the various color-developing substances, and the physical and chemical properties of the solvent. The type of chromogenic compound selected will determine the hue or color of the final print or image and the amount of the chromogenic compound must be balanced with the amount of the color-developing substance used to ensure the desired final intensity, speed, and stability of the final print or image. While a lesser amount can be used, there should be used an amount of color developer at least stoichiometrically equal to the total amount of chromogenic compound(s) used. This will act to ensure maximum color development. The solvent used with any particular combination of chromogenic compound(s) and color-developing substance(s) must possess good solvating and other properties discussed above.

However, by operating within the parameters disclosed herein, one skilled in this art can by routine experimentation determine for any particular chromogenic compound the most suitable color-developing substance and solvent and proportions thereof to give the desired final hue or color and a final print having the desired intensity and stability.

The reaction product is formed by dissolving the requisite amounts of leuco chromogenic compound,(s) and color developer(s) in the oleophilic solvent and permitting them to react. The reaction takes place at ambient temperatures and pressures, although in some instances a slightly elevated temperature may be required to dissolve a particular color developer or to cause the reaction to proceed more rapidly. When polyvalent ions or ammonia are used; as hereinafter described, they can simply be added to the reaction product solution prior to or subsequent to the formation of the reaction product.

Chemical and physical methods of microencapsulation are well known. For example, methods involving the phenomena of "complex" or "simple" coacervation, wherein two oppositely charged colloids, such as gelatin and gum arabic, or gelatin and an ionic salt such as sodium sulfate, are utilized under controlled conditions of pH, temperature, and concentration to form a liquid wall around dispersed oil droplets containing a chromogen, which liquid wall is subsequently hardened by chemical action, have long been used in the commercial manufacture of carbonless papers. Several other non-coacervate microencapsulation systems have been described in U.S. Pat. Nos. 3,779,941, 3,875,074, 3,886,084, 4,000,087, 4,062,799, and 4,586,060. Most of these systems involve the formation of microcapsules by interfacial cross-linking or complexing methods, whereby a cross-linking or a complexing agent is incorporated and allowed to react with one or more polymeric materials having cross-linkable or complexable sites to form the capsule wall. These known microencapsulation methods may be used in the instant invention. In deciding which encapsulation method may be used in this invention, care must be exercised to select a method in which the chemicals and processing steps do not interfere with, or are not interfered by, the specific components and processing steps of the present invention; there being an ample variety of available encapsulation methods which meet these criteria as discussed above. Routine experimentation can determine the most suitable microencapsulation system to be used for any particular combination of leuco chromogenic compound(s) and color-developing substance(s).

In the instant case, the leuco chromogenic compound(s) and electron-accepting color developer are reacted in the oleophilic solvent, as previously noted, the resultant solution of the reaction product dispersed to form droplets and an encapsulating material used, as noted above, to form a capsule wall about the droplets, and the walls then hardened to form individual microcapsules containing therein the reaction product solution, when the polyvalent metal ions and/or ammonia are used. These are added to the reaction product solution prior to formation of the droplets.

It has been found, during the development of this invention, that the addition of small amounts of polyvalent metal ions to the reaction product solutions can greatly enhance the stability and the intensity of the formed images. With the use of these polyvalent ions it is now possible to make images of high intensity and stability with the usually unstable and rather low intensity black fluorans. In this mode of the invention the leuco dye(s) can be reacted with the color former(s) and at least one polyvalent metal of Group IVB through IIIA in the Periodic Table of the Chemical Elements, such as zinc, nickel, cadmium, titanium, aluminum, tin, magnesium, manganese, and the like, usually introduced into the oil-dye formulation in the form of an organometallic compound such as zinc octoate, nickel octoate in solution in a solvent therefor such as mineral spirits, and the like. Optionally, these metal salts can be introduced into the system in relatively small quantities as very concentrated aqueous solutions. In both cases, about 2% by weight or less of the metallic salt, based on the total weight of the reaction product solution is sufficient. The metallic salt can be added prior to, during, or subsequent to the reaction between the leuco dye(s) and color former(s).

In another mode of this invention, it has been surprisingly found that when the leuco chromogenic compound(s) and the electron-accepting, color-forming substance(s) dissolved in a common or mutual oleophilic solvent, are allowed to react with each other, especially in the presence of polyvalent ions, the addition of relatively small amounts from about one to twenty percent by weight of the total dye-color developer solution) of either liquid or aqueous ammonia (ammonium hydroxide) render the entire solution essentially colorless. This colorless solution is then encapsulated under the usual carefully controlled conditions of temperature and pH, and the microcapsules coated onto the back side of a paper substrate producing a coated back (CB), self-contained carbonless substrate. This is to say, when this CB paper is mated with an uncoated underlying sheet and localized pressure is applied to the front of the CB paper, brilliantly-colored, stable images are formed on the front surfaces of the underlying, uncoated sheet. These images are extremely stable even after prolonged exposures to atmospheric conditions of heat, temperature, and light. This is especially true when the polyvalent metallic ions employed are zinc, cadmium, aluminum, nickel, tin, magnesium, titanium, or manganese. While not completely understood, a possible explanation for such a phenomenon is the fact that some of these metallic elements such as zinc and cadmium, for example, are known to form hydroxyl and ammonia containing anion complexes which can be described as $[M(NH_3)_x]$—, where M is the metal and x is the complex co-ordination number of the metal. These anion complexes are known to have rather limited stability, especially under hydrolytic conditions, and this fact coupled with the "bleaching" effect of ammonia toward leuco dyes (leuco dyes by definition are colorless in neutral or alkaline media) even when no polyvalent metal ions are added could explain this surprising and highly desirable behavior of the imaging solutions of this invention which contain ammonia and metallic ions. It can be presumed that any other compound capable of forming complexes of relatively low stability in alkaline media with the metallic ions, or have the same "bleaching" effect upon the leuco chromogenic compounds without impairing their ability to act as color precursors could be used in lieu of ammonia and still produce the same favorable effects in the instant invention; exemplary of such presumption can be the reaction product of a leuco compound with a phenolic ester.

In another mode of the present invention, the leuco chromogenic compound(s) is dissolved in an oleophilic solvent, allowed to react with a polyvalent metallic ion, such as described above, encapsulated, and coated onto a substrate to produce a CB part of conventional carbonless copy systems. Even though such polyvalent ions are electron-accepting species and could behave as the color developers for the leuco dyes, the resulting images lack sufficient intensity and stability. If, however, these leuco-dye-polyvalent ion products or complexes which are essentially colorless, are encapsulated and used as "new and improved" chromogenic compounds in the production of conventional and self-contained carbonless copying systems, they substantially improve the intensity and the stability of the formed images.

It has also been found during the development of this invention that the addition of small amounts (between 0.5% and 2.0% of the weight of the leuco dye-electron acceptor solution) of conventional ultra violet absorbers such as nickel bis(octyl phenol) sulfide, hydroxy benzophenones, hydroxy benzotriazoles and the like, to the leuco dye-electron acceptor solutions can further improve the light stability of the colored images.

The microcapsules can be applied to the transfer sheet in the conventional manner, such as by the use of conventional paper coaters; i.e., gate-rolls, air-knives, reverse rolls, and the like. They can also be applied to the paper web to be used as the transfer sheet using such commercial printing methods and apparatus such as wet and dry offset, direct letter presses, and the like. The transfer sheet itself can be formed of any substrate, such as paper, conventionally used in forming pressure-sensitive chromogenic copy systems.

The coating weight of the microcapsules can vary widely with any weight conventionally used being adequate, so long as the desired color intensity can be obtained.

The invention will be further described in connection with the examples that follow, which are set forth for purposes of illustration only.

In these examples the following materials with their respective designations indicated in parentheses (where used) are used to prepare oil and dye solutions: Ciba-Geigy's Pergascript Black (I-BR), Pergascript Blue (I-2R), or CVL, Pergascript Green (I-GD), Pergascript Red (I-6B), Pergascript Orange (I-5R), benzoyl leuco methylene blue (BLMB), soya-bean oil (SBO), isopropyl biphenyl (IPBP) and isobutyl biphenyl (IBB), Monsanto's partially hydrogenated terphenyl (HB-40), alkylated naphthalenes, and Eastman Kodak's Texanol and Ektasolve products. Unless otherwise noted, all parts are by weight.

EXAMPLE 1

This example illustrates the invention wherein the addition of small amounts of a polyvalent ion to a solution of the leuco chromogenic substance can improve substantially the fade characteristics of the colored images made on CF surfaces.

Three parts of each of the following leuco dyes are each dissolved in 100 parts of Monsanto's HB-40: Pergascript Black (I-BR), Pergascript Blue (I-2R), Pergascript Green (I-GD), Pergascript Red (I-6B), and Pergascript Orange (I-5R). Three parts of an 18% solution of zinc octoate in mineral spirits are added to each of the solutions of the leuco dyes and allowed to react for 10 to 15 minutes and then smears of each of the solutions are made on each of three different CF papers; each having a different electron-acceptor coating. One of the coatings comprises a montmorillonite clay, the second a phenol-aldehyde condensation product, and the third a salicylic acid derivative. Each of the smears is placed at a distance of 6 inches from an ultraviolet lamp of 750 )W/cm$^2$ and exposed continuously to the lamp. Although the degree of fade resistance varies, the smears of all the leuco dyes on all three CF surfaces exhibit significant improvement in fade resistance on all three CF surfaces; even after two days of continuous exposure the colors of all smears have acceptable intensity.

EXAMPLE 2

This example illustrates the invention wherein the addition of approximately stoichiometric amounts of an electron-acceptor substance to a solution of a leuco dye and a polyvalent ion greatly enhances the fade resistance of the colored images.

Example 1 is repeated, but prior to the addition of the zinc octoate, 1.5 parts of p-octyl salicylic acid are dissolved in the leuco dye solution by heating at 50° C. for about 15 minutes. Smears are made on the same three CF's and on completely uncoated papers and exposed to an ultraviolet lamp as in Example 1, which smears have significantly higher initial (prior to the ultraviolet exposure) color intensities compared to those in Examples 1 and la. All the smears, including those made on the uncoated papers are able to withstand continuous exposures to the ultraviolet rays for ten or more days without any significant reduction in color intensity.

EXAMPLE 3

(Comparative)

Three parts of each of the following leuco dyes are each dissolved in 100 parts of Monsanto's HB-40: Pergascript Black (I-BR), Pergascript Blue (I-2R), Pergascript Green (I-GD), Pergascript Red (I-6B), and Pergascript Orange (I-5R). Smears of each of these solutions are made on each of the same three different CF papers used in Example 1 and exposed to an ultraviolet lamp as in Example 1. The colors of all smears fade substantially in all three surfaces in less than twenty-four hours and the degree of fade varies depending upon the CF surface being used, with the salicylate CF showing somewhat better color stability while the montmorillonite CF exhibiting the worst color stability among the three CF's used. Also the Pergascript Orange (I-5R) shows slightly better color fastness than the other leuco dyes, but none of the smears have acceptable color intensity after the exposure.

EXAMPLE 4

A solution to be encapsulated and used in the preparation of the novel self-contained carbonless system of this invention is prepared as follows: To a solution of 60 parts of HB-40 and 10 parts of Eastman Kodak's Texanol, 5 parts of Pergascript Black (I-BR), 2 parts of Pergascript Blue (I-2R), 2 parts of benzoyl leuco methylene blue, 1 part of Pergascript Green (I-GD), and 1.5 parts of Pergascript Red (I-6B) are dissolved by heating the solution to between 60° and 70° C. After complete dissolution of the leuco dyes, 5.5 parts of p-octyl salicylic acid are dissolved and the solution allowed to cool to room temperature. Subsequently, 5 parts of an 18% solution of zinc octoate in mineral spirits are added and allowed to react for about 10 to 15 minutes. At this point the color of the solution is a very intense black. When ten milliliters of aqueous ammonia are added, the color of the solution turns to a very faint pinkish, lavender color.

One hundred grams of water, containing 6 grams of an 88% hydrolyzed polyvinyl alcohol (Airco's Vinol-540) and 5 milliliters of 5N sodium carbonate are emulsified with the oily solution prepared above. After the emulsion particles reach an average diameter of about 5 to 5.5 microns, 150 milliliters of an 1M solution of sodium borate decahydrate were slowly added to the emulsion with brisk agitation, resulting in the formation of well defined microcapsules. The microcapsular dispersion is coated onto the back side of a paper substrate and dried to produce a self-contained CB paper. When the CB thus prepared is mated with the surface of an uncoated sheet and localized pressure applied on the front side of the CB paper, intense black images are formed on the front surface of the underlying uncoated sheet. These colored images exhibit excellent resistance to fade upon prolonged exposures to ultraviolet rays under the test conditions set forth in Example 1.

EXAMPLE 5

Ninety-eight parts of a solution containing 60 parts of di-isopropyl naphthalene, 20 parts of monoisopropyl biphenol, 4 parts of Eastman Kodak's Ektasolve DE, 3 parts of Pergascript Blue (I-2R), 0.3 part of Pergascript Red (I-6B), 0.5 part benzoyl leuco methylene blue, 0.5 part of nickel bis(octyl phenol) sulfide, 1.5 parts of 3,5, di-tertiary butyl salicylic acid, 5 parts of an 18% solution of zinc octoate in mineral spirits, and 3.2 parts of 30% aqueous ammonia are emulsified with 100 parts of a 5% aqueous solution of an 88% hydrolyzed polyvinyl alcohol. Emulsification is continued until an average particle size of between 5 and 5.5 microns is obtained. Ten parts of a 60% aqueous solution of melamine-formaldehyde resin (Virginia Chemicals Virset 656-4) are added to the emulsion, stirred for about five hours at between 40° and 45° C. The resultant microcapsular dispersion is coated onto the back side of a paper substrate and dried to produce a self-contained CB paper. When the CB paper is mated with an underlying uncoated sheet and localized pressure applied on the front side of the CB paper, blueish-purple images of high color intensity are formed on the front side of the underlying sheet. These colored images exhibit excellent fade resistance to prolonged exposures to ultraviolet light as set forth in Example 1.

The self-contained CB papers produced in Examples 4 and 5 above can be used to produce colored markings of a variety of CF coated papers used in conventional carbonless copy systems and the images obtained are of substantially higher initial color intensity. They also exhibit substantially higher fade resistance during prolonged exposures to light compared to images made on the same CF surfaces with microcapsules containing only the corresponding leuco dyes in equivalent concentrations but in the absence of any electron-acceptors and polyvalent ions.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. Microcapsules consisting essentially of external encapsulating material having encapsulated therein a solution in an oleophilic solvent of the reaction product of at least one leuco chromogenic compound and at least one electron-accepting color developer capable of reacting with said leuco chromogenic compound in an oleophilic solvent, at least one organometallic salt of at least one polyvalent metal of Group IVB through IIIA of the Periodic Table, and liquid or aqueous ammonia in an amount of from 1 to 20% by weight of the weight of the reaction product solution; said oleophilic solvent being a solvent for said leuco chromogenic compound, said color developer, and said reaction product.

2. The microcapsules of claim 1, wherein said color developer is a low molecular weight phenol aldehyde resin and/or metal salt thereof of a derivative of an aromatic carboxylic acid and/or a metal salt thereof.

3. The microcapsules of claim 2, wherein the metal salt is zinc octoate, nickel octoate, or mixtures thereof and said color developer is p-octyl salicylic acid.

4. The method of making microcapsules comprising:

(a) reacting in an oleophilic solvent at least one leuco chromogenic compound and at least one electron-accepting color developer capable of reacting with said leuco chromogenic compound for a time and at a temperature sufficient to form a reaction product in solution; said oleophilic solvent being a solvent for said leuco chromogenic compound, said color developer, and said reaction product, (b) incorporating in said solution at least one organometallic salt of at least one polyvalent metal of Group IVB through IIIA of The Periodic Table and liquid or aqueous ammonia in an amount from 1 to 20% by weight of the reaction product solution, (c) forming a capsule wall of encapsulation material about droplets of said reaction product solution, and (d) hardening said capsule walls to form individual microcapsules containing therein said reaction product solution.

5. The method of claim 1, wherein said color developer is a low molecular weight phenol aldehyde resin and/or metal salt thereof or a derivative of an aromatic carboxylic acid and/or a metal salt thereof.

6. The method of claim 5, wherein the metal salt is selected from zinc octoate, nickel octoate, or mixtures thereof and said color developer is p-octyl salicylic acid.

* * * * *